(12) United States Patent
Walton et al.

(10) Patent No.: US 9,982,506 B2
(45) Date of Patent: May 29, 2018

(54) DEGRADABLE WELLBORE ISOLATION DEVICES WITH LARGE FLOW AREAS

(71) Applicant: Halliburton Energy Services, Inc., Houston, TX (US)

(72) Inventors: Zachary Walton, Carrollton, TX (US); Michael Linley Fripp, Carrollton, TX (US); Michael James Jurgensmeier, Duncan, OK (US); Zachary Murphree, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 322 days.

(21) Appl. No.: 14/758,989

(22) PCT Filed: Aug. 28, 2014

(86) PCT No.: PCT/US2014/053212
§ 371 (c)(1),
(2) Date: Jul. 2, 2015

(87) PCT Pub. No.: WO2016/032493
PCT Pub. Date: Mar. 3, 2016

(65) Prior Publication Data
US 2016/0251934 A1    Sep. 1, 2016

(51) Int. Cl.
*E21B 33/12*    (2006.01)
*E21B 33/129*    (2006.01)
(Continued)

(52) U.S. Cl.
CPC .............. *E21B 33/12* (2013.01); *C09K 8/428* (2013.01); *C22C 21/00* (2013.01); *C22C 23/02* (2013.01);
(Continued)

(58) Field of Classification Search
CPC ...... E21B 33/10; E21B 33/12; E21B 33/1208; E21B 33/1204; E21B 43/28
(Continued)

(56) References Cited

U.S. PATENT DOCUMENTS

| 4,655,852 A | 4/1987 | Rallis |
| 5,984,007 A | 11/1999 | Yuan et al. |

(Continued)

FOREIGN PATENT DOCUMENTS

| CA | 2886988 C | 8/2017 |
| WO | 2005090742 A1 | 9/2005 |

(Continued)

OTHER PUBLICATIONS

Ginger Gardiner, "Composites boon from hyrdaulic fracturing?" CompositesWorld, Jan. 8, 2014, XP055267997, obtained from http://www.compositesworld.com/blog/post/composites-boon-from-hydraulic-fracturing.

(Continued)

*Primary Examiner* — Kenneth L Thompson
(74) *Attorney, Agent, or Firm* — McDermott Will & Emery LLP

(57) ABSTRACT

An example downhole tool for use in a wellbore lined with casing includes a wellbore isolation device that provides a plurality of components including a mandrel that defines a central flow passage that allows fluid flow in at least one direction through the wellbore isolation device, the wellbore isolation device providing an inner diameter and an outer diameter. A minimum production flow area is provided across the wellbore isolation device and is determined by at least one of: a flow area across the wellbore isolation device that is at least 1/16 a total flow area of the casing at a location of the wellbore isolation device within the wellbore, and a flow area resulting from the inner diameter being at least (Continued)

25% of the outer diameter. At least the mandrel is made of a slowly degradable material that degrades when exposed to a wellbore environment.

32 Claims, 2 Drawing Sheets

(51) Int. Cl.

| | | |
|---|---|---|
| C22C 23/02 | (2006.01) | |
| C22C 23/04 | (2006.01) | |
| E21B 33/13 | (2006.01) | |
| E21B 43/26 | (2006.01) | |
| C09K 8/42 | (2006.01) | |
| C22C 21/00 | (2006.01) | |
| E21B 33/134 | (2006.01) | |

(52) U.S. Cl.
CPC .......... *C22C 23/04* (2013.01); *E21B 33/1293* (2013.01); *E21B 33/1294* (2013.01); *E21B 33/13* (2013.01); *E21B 33/134* (2013.01); *E21B 43/26* (2013.01)

(58) Field of Classification Search
USPC ......................................... 166/317, 376, 164
See application file for complete search history.

(56) References Cited

U.S. PATENT DOCUMENTS

| | | | |
|---|---|---|---|
| 7,168,494 B2 | 1/2007 | Starr et al. | |
| 7,350,582 B2 * | 4/2008 | McKeachnie | E21B 33/1294 166/194 |
| 7,353,879 B2 | 4/2008 | Todd et al. | |
| 7,690,436 B2 * | 4/2010 | Turley | E21B 33/134 166/135 |
| 8,211,248 B2 | 7/2012 | Marya | |
| 8,267,177 B1 * | 9/2012 | Vogel | E21B 33/1294 166/131 |
| 8,413,727 B2 | 4/2013 | Holmes | |
| 8,573,295 B2 | 11/2013 | Johnson et al. | |
| 8,695,714 B2 | 4/2014 | Xu et al. | |
| 8,746,342 B1 * | 6/2014 | Nish | E21B 33/1294 137/68.11 |
| 8,905,147 B2 | 12/2014 | Fripp et al. | |
| 9,016,363 B2 * | 4/2015 | Xu | E21B 43/106 166/135 |
| 9,217,319 B2 * | 12/2015 | Frazier | E21B 33/134 |
| 9,309,744 B2 * | 4/2016 | Frazier | E21B 33/134 |
| 2006/0131031 A1 | 6/2006 | McKeachnie et al. | |
| 2006/0278405 A1 | 12/2006 | Turley et al. | |
| 2007/0074873 A1 | 4/2007 | McKeachnie et al. | |
| 2008/0149345 A1 | 6/2008 | Marya et al. | |
| 2010/0270031 A1 | 10/2010 | Patel | |
| 2011/0048743 A1 | 3/2011 | Stafford et al. | |
| 2011/0067889 A1 | 3/2011 | Marya et al. | |
| 2011/0132621 A1 | 6/2011 | Agrawal et al. | |
| 2012/0097384 A1 | 4/2012 | Valencia et al. | |
| 2012/0125642 A1 | 5/2012 | Chenault et al. | |
| 2012/0292053 A1 | 11/2012 | Xu et al. | |
| 2012/0318513 A1 | 12/2012 | Mazyar et al. | |
| 2013/0048305 A1 | 2/2013 | Xu et al. | |
| 2013/0112429 A1 | 5/2013 | Crews | |
| 2013/0327540 A1 | 12/2013 | Hamid et al. | |
| 2014/0027128 A1 | 1/2014 | Johnson et al. | |
| 2014/0190685 A1 | 7/2014 | Frazier et al. | |
| 2014/0190705 A1 | 7/2014 | Fripp et al. | |
| 2014/0224477 A1 | 8/2014 | Wiese et al. | |
| 2014/0305627 A1 * | 10/2014 | Manke | E21B 33/1208 166/118 |
| 2015/0354311 A1 * | 12/2015 | Okura | B29C 47/0004 175/57 |
| 2016/0201427 A1 | 7/2016 | Fripp et al. | |
| 2016/0230498 A1 | 8/2016 | Walton et al. | |
| 2016/0298412 A1 | 10/2016 | Fripp et al. | |

FOREIGN PATENT DOCUMENTS

| | | |
|---|---|---|
| WO | 2013109287 A1 | 7/2013 |
| WO | 2014100141 A2 | 6/2014 |
| WO | WO-2015171126 A1 | 11/2015 |
| WO | 2016032493 A1 | 3/2016 |
| WO | 2016032620 A1 | 3/2016 |
| WO | 2016032621 A1 | 3/2016 |
| WO | 2016032761 A1 | 3/2016 |

OTHER PUBLICATIONS

Search Report received in corresponding Netherlands Application No. 1041449, dated May 17, 2016.
International Search Report and Written Opinion for PCT/US2015/038624 dated Sep. 18, 2015.
International Search Report and Written Opinion for PCT/US2015/038607 dated Sep. 18, 2015.
International Search Report and Written Opinion for PCT/US2014/053212 dated May 29, 2015.
Canadian Office Action from Canadian Patent Application No. 2,955,922; dated Dec. 8, 2017, 3 pages.
Australian Examination Report from Australian Patent Application No. 2015307211, dated Feb. 5, 2018, 5 pages.

* cited by examiner

DEGRADABLE WELLBORE ISOLATION DEVICES WITH LARGE FLOW AREAS

BACKGROUND

The present disclosure generally relates to downhole tools used in the oil and gas industry and, more particularly, to wellbore isolation devices made of slowly degrading materials and having large inner diameter flow areas.

In the drilling, completion, and stimulation of hydrocarbon-producing wells, a variety of downhole tools are used. For example, it is often desirable to seal portions of a wellbore, such as during fracturing operations when various fluids and slurries are pumped from the surface into a casing string that lines the wellbore, and forced out into a surrounding subterranean formation through the casing string. It thus becomes necessary to seal the wellbore and thereby provide zonal isolation at the location of the desired subterranean formation. Wellbore isolation devices, such as packers, bridge plugs, and fracturing plugs (i.e., "frac" plugs) are designed for these general purposes and are well known in the art of producing hydrocarbons, such as oil and gas. Such wellbore isolation devices may be used in direct contact with the formation face of the wellbore, with a casing string extended and secured within the wellbore, or with a screen or wire mesh.

After the desired downhole operation is complete, the seal formed by the wellbore isolation device must be broken and the tool itself removed from the wellbore. Removing the wellbore isolation device may allow hydrocarbon production operations to commence without being hindered by the presence of the downhole tool. Removing wellbore isolation devices, however, is traditionally accomplished by a complex retrieval operation that involves milling or drilling out a portion of the wellbore isolation device, and subsequently mechanically retrieving its remaining portions. To accomplish this, a tool string having a mill or drill bit attached to its distal end is introduced into the wellbore and conveyed to the wellbore isolation device to mill or drill out the wellbore isolation device. After drilling out the wellbore isolation device, the remaining portions of the wellbore isolation device may be grasped onto and retrieved back to the surface with the tool string for disposal. As can be appreciated, this retrieval operation can be a costly and time-consuming process.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure generally relates to downhole tools used in the oil and gas industry and, more particularly, to wellbore isolation devices made of slowly degrading materials and having large inner diameter flow areas.

The present disclosure describes embodiments of wellbore isolation devices that are made of slowly degrading materials. The slowly degrading materials are typically less expensive than rapidly degrading materials and, therefore, the wellbore isolation devices described herein may be less expensive as compared to wellbore isolation devices made of rapidly dissolving or degrading materials. The slowly degrading materials allow for more time between setting the wellbore isolation devices and when a particular downhole operation is undertaken, such as a hydraulic fracturing treatment operation. Moreover, slowly degrading materials allow for acid treatments and acidified stimulation of a wellbore. With slowly degrading materials, however, the wellbore isolation devices described herein may require a greater flow area or flow capacity to enable production operations without unreasonably impeding or obstructing fluid flow while the wellbore isolation device degrades. As a result, production operations may be efficiently undertaken while the wellbore isolation devices degrade and without creating significant pressure restrictions.

As used herein, the term "degradable" and all of its grammatical variants (e.g., "degrade," "degradation," "degrading," "dissolve," "dissolving," and the like) refers to the dissolution or chemical conversion of solid materials such that reduced-mass solid end products by at least one of solubilization, hydrolytic degradation, biologically formed entities (e.g., bacteria or enzymes), chemical reactions (including electrochemical and galvanic reactions), thermal reactions, or reactions induced by radiation. In complete degradation, no solid end products result. In some instances, the degradation of the material may be sufficient for the mechanical properties of the material to be reduced to a point that the material no longer maintains its integrity and, in essence, falls apart or sloughs off to its surroundings. The conditions for degradation are generally wellbore conditions where an external stimulus may be used to initiate or effect the rate of degradation. For example, the pH of the fluid that interacts with the material may be changed by introduction of an acid or a base. The term "wellbore environment" includes both naturally occurring wellbore environments and materials or fluids introduced into the wellbore.

Figure 1:
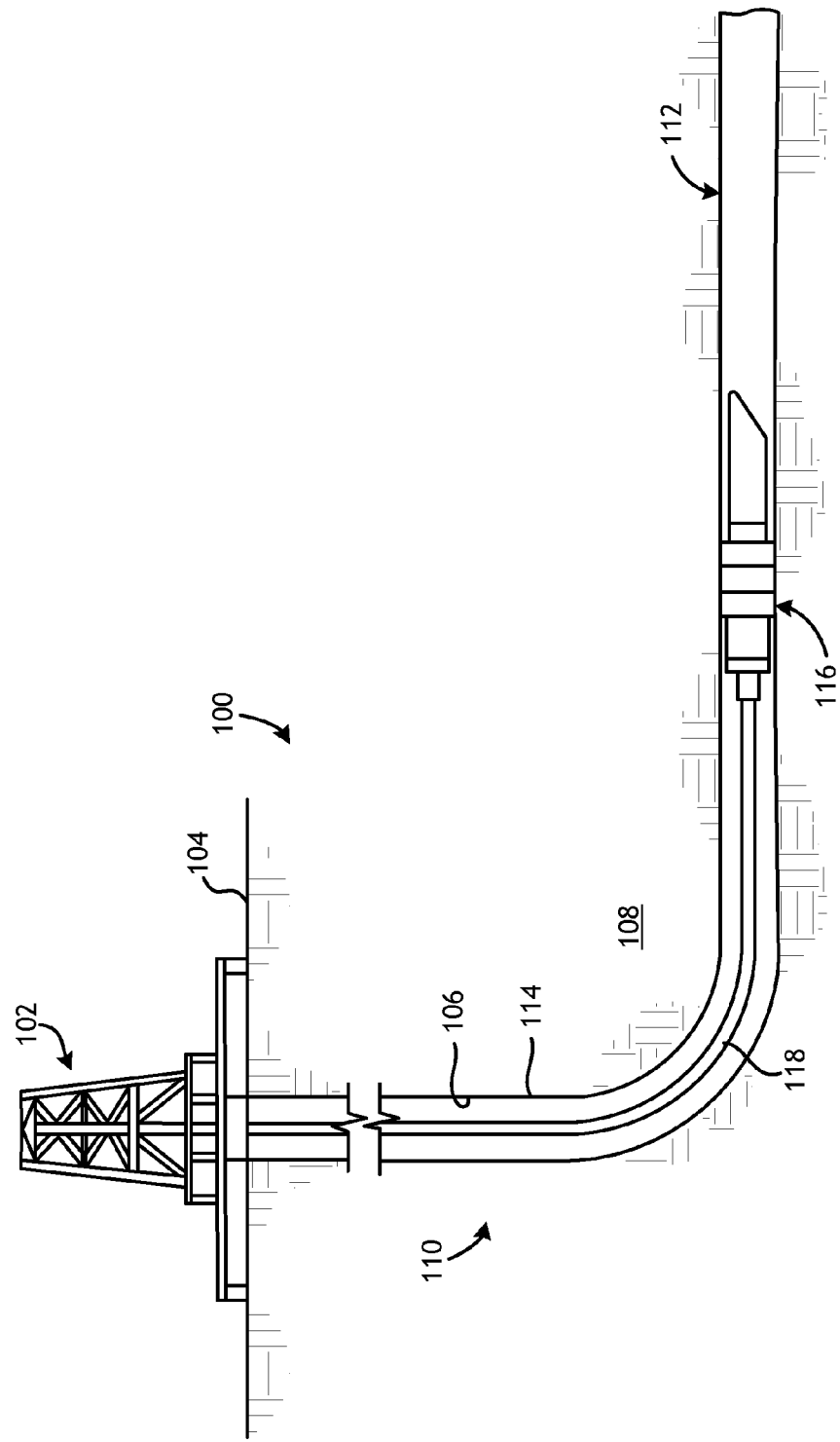
FIG. 1 is a well system that can employ one or more principles of the present disclosure, according to one or more embodiments.

Referring to FIG. 1, illustrated is a well that may embody or otherwise employ one or more principles of the present disclosure, according to one or more embodiments. As illustrated, the well system 100 may include a service rig 102 that is positioned on the earth's surface 104 and extends over and around a wellbore 106 that penetrates a subterranean formation 108. The service rig 102 may be a drilling rig, a completion rig, a workover rig, or the like. In some embodiments, the service rig 102 may be omitted and replaced with a standard surface wellhead completion or installation, without departing from the scope of the disclosure. While the well system 100 is depicted as a land-based operation, it will be appreciated that the principles of the present disclosure could equally be applied in any sea-based or sub-sea application where the service rig 102 may be a floating platform or sub-surface wellhead installation, as generally known in the art.

The wellbore 106 may be drilled into the subterranean formation 108 using any suitable drilling technique and may extend in a substantially vertical direction away from the earth's surface 104 over a vertical wellbore portion 110. At some point in the wellbore 106, the vertical wellbore portion 110 may deviate from vertical relative to the earth's surface 104 and transition into a substantially horizontal wellbore portion 112. In some embodiments, the wellbore 106 may be completed by cementing a string of casing 114 within the wellbore 106 along all or a portion thereof. As used herein, the term "casing" refers not only to casing as generally known in the art, but also to borehole liner, which comprises tubular sections coupled end to end but not extending to a surface location. In other embodiments, however, the string of casing 114 may be omitted from all or a portion of the wellbore 106 and the principles of the present disclosure may equally apply to an "open-hole" environment.

The well system 100 may further include a wellbore isolation device 116 that may be conveyed into the wellbore 106 on a conveyance 118 that extends from the service rig 102. The wellbore isolation device 116 may include or otherwise comprise any type of casing or borehole isolation device known to those skilled in the art including, but not limited to, a frac plug, a deployable baffle, a wellbore packer, or any combination thereof. The conveyance 118 that delivers the wellbore isolation device 116 downhole may be, but is not limited to, wireline, slickline, an electric line, coiled tubing, drill pipe, production tubing, or the like.

The wellbore isolation device 116 may be conveyed downhole to a target location (not shown) within the wellbore 106. At the target location, the wellbore isolation device may be actuated or "set" to seal the wellbore 106 and otherwise provide a point of fluid isolation within the wellbore 106. In some embodiments, the wellbore isolation device 116 is pumped to the target location using hydraulic pressure applied from the service rig 102 at the surface 104. In such embodiments, the conveyance 118 serves to maintain control of the wellbore isolation device 116 as it traverses the wellbore 106 and provides the necessary power to actuate and set the wellbore isolation device 116 upon reaching the target location. In other embodiments, the wellbore isolation device 116 freely falls to the target location under the force of gravity to traverse all or part of the wellbore 106.

It will be appreciated by those skilled in the art that even though FIG. 1 depicts the wellbore isolation device 116 as being arranged and operating in the horizontal portion 112 of the wellbore 106, the embodiments described herein are equally applicable for use in portions of the wellbore 106 that are vertical, deviated, or otherwise slanted. It should also be noted that a plurality of wellbore isolation devices 116 may be placed in the wellbore 106. In some embodiments, for example, several (e.g., six or more) wellbore isolation devices 116 may be arranged in the wellbore 106 to divide the wellbore 106 into smaller intervals or "zones" for hydraulic stimulation. Moreover, use of directional terms such as above, below, upper, lower, upward, downward, uphole, downhole, and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Figure 2:
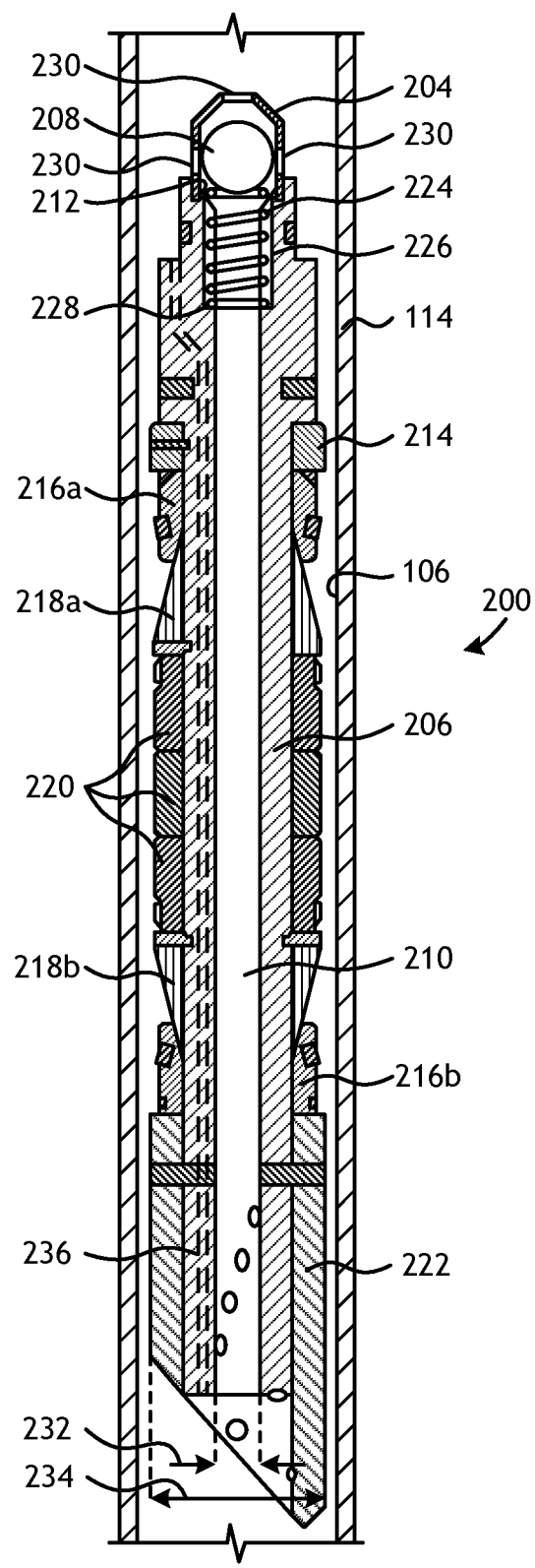
FIG. 2 is a cross-sectional side view of an exemplary frac plug that can employ the principles of the present disclosure.

Referring now to FIG. 2, with continued reference to FIG. 1, illustrated is a cross-sectional view of an exemplary wellbore isolation device 200 that may employ one or more of the principles of the present disclosure, according to one or more embodiments. The wellbore isolation device 200 may be similar to or the same as the wellbore isolation device 116 of FIG. 1. Accordingly, the wellbore isolation device 200 may be configured to be extended into and seal the wellbore 106 at a target location, and thereby prevent fluid flow past the wellbore isolation device 200 for wellbore completion or stimulation operations. In some embodiments, as illustrated, the wellbore 106 may be lined with the casing 114 or another type of wellbore liner or tubing in which the wellbore isolation device 200 may suitably be set. In other embodiments, however, the casing 114 may be omitted and the wellbore isolation device 200 may instead be set or otherwise deployed in an uncompleted or "open-hole" environment.

The wellbore isolation device 200 is generally depicted and described herein as a hydraulic fracturing plug or "frac" plug. It will be appreciated by those skilled in the art, however, that the principles of this disclosure may equally apply to any of the other aforementioned types of casing or borehole isolation devices, without departing from the scope of the disclosure. Indeed, the wellbore isolation device 200 may be any of a frac plug, a wellbore packer, a deployable baffle, or any combination thereof in keeping with the principles of the present disclosure.

As illustrated, the wellbore isolation device 200 may include a ball cage 204 extending from or otherwise coupled to the upper end of a mandrel 206. A sealing or "frac" ball 208 is disposed in the ball cage 204 and the mandrel 206 defines a longitudinal central flow passage 210. The mandrel 206 also defines a ball seat 212 at its upper end. One or more spacer rings 214 (one shown) may be secured to the mandrel 206 and otherwise extend thereabout. The spacer ring 214 provides an abutment, which axially retains a set of upper slips 216a that are also positioned circumferentially about the mandrel 206. As illustrated, a set of lower slips 216b may be arranged distally from the upper slips 216a. In other embodiments, the ball 208 may be dropped into the conveyance 118 (FIG. 1) to land on top of the wellbore isolation device 200 rather than being carried within the ball cage 204.

One or more slip wedges 218 (shown as upper and lower slip wedges 218a and 218b, respectively) may also be positioned circumferentially about the mandrel 206, and a packer assembly consisting of one or more expandable or inflatable packer elements 220 may be disposed between the upper and lower slip wedges 218a,b and otherwise arranged about the mandrel 206. It will be appreciated that the particular packer assembly depicted in FIG. 2 is merely representative as there are several packer arrangements known and used within the art. For instance, while three packer elements 220 are shown in FIG. 2, the principles of the present disclosure are equally applicable to wellbore isolation devices that employ more or less than three packer elements 220, without departing from the scope of the disclosure.

A mule shoe 222 may be positioned at or otherwise secured to the mandrel 206 at its lower or distal end. As will be appreciated, the lower most portion of the wellbore isolation device 200 need not be a mule shoe 222, but could be any type of section that serves to terminate the structure of the wellbore isolation device 200, or otherwise serves as a connector for connecting the wellbore isolation device 200 to other tools, such as a valve, tubing, or other downhole equipment.

In some embodiments, a spring 224 may be arranged within a chamber 226 defined in the mandrel 206 and otherwise positioned coaxial with and fluidly coupled to the central flow passage 210. At one end, the spring 224 biases a shoulder 228 defined by the chamber 226 and at its opposing end the spring 224 engages and otherwise supports the frac ball 208. The ball cage 204 may define a plurality of ports 230 (three shown) that allow the flow of fluids therethrough, thereby allowing fluids to flow through the length of the wellbore isolation device 200 via the central flow passage 210.

As the wellbore isolation device 200 is lowered into the wellbore 106, the spring 224 prevents the frac ball 208 from engaging the ball seat 212. As a result, fluids may pass through the wellbore isolation device 200; i.e., through the ports 230 and the central flow passage 210. The ball cage 204 retains the frac ball 208 such that it is not lost during translation into the wellbore 106 to its target location. Once the wellbore isolation device 200 reaches the target location, a setting tool (not shown) of a type known in the art can be used to move the wellbore isolation device 200 from its unset position (shown in FIG. 2) to a set position. The setting tool may operate via various mechanisms to anchor the wellbore isolation device 200 in the wellbore 106 including, but not limited to, hydraulic setting, mechanical setting, setting by swelling, setting by inflation, and the like. In the set position, the slips 216a,b and the packer elements 220 expand and engage the inner walls of the casing 114.

When it is desired to seal the wellbore 106 at the target location with the wellbore isolation device 200, fluid is injected into the wellbore 106 and conveyed to the wellbore isolation device 200 at a predetermined flow rate that overcomes the spring force of the spring 224 and forces the frac ball 208 downwardly until it sealingly engages the ball seat 212. When the frac ball 208 is engaged with the ball seat 212 and the packer elements 220 are in their set position, fluid flow past or through the wellbore isolation device 200 in the downhole direction is effectively prevented. At that point, completion or stimulation operations may be undertaken by injecting a treatment or completion fluid into the wellbore 106 and forcing the treatment/completion fluid out of the wellbore 106 and into a subterranean formation above the wellbore isolation device 200.

Following completion and/or stimulation operations, the wellbore isolation device 200 must be removed from the wellbore 106 in order to allow production operations to effectively occur without being excessively hindered by the emplacement of the wellbore isolation device 200. According to the present disclosure, various components of the wellbore isolation device 200 may be made of one or more slowly degrading or dissolving materials. The slowly degrading materials provide more time between setting the wellbore isolation device 200 and when a desired completion or stimulation operation is undertaken, such as a hydraulic fracturing operation. Moreover, slowly degrading materials allow for acid treatments and acidified stimulation of the wellbore 106. As will be appreciated, slowly degrading materials are typically less expensive than rapidly degrading metals and, therefore, the wellbore isolation device 200 may be less expensive as compared to wellbore isolation devices made of rapidly dissolving or degrading materials.

As made of slowly degrading materials, however, the wellbore isolation device 200 may require a greater flow area or flow capacity through and/or around the wellbore isolation device 200 so as to be appealing to well operators. More particularly, well operators typically desire wellbore isolation devices that degrade rapidly and are thereby quickly removed as a fluid flow obstruction from within the wellbore so that production operations can proceed with minimal pressure drop through the production tubing. According to the present disclosure, the wellbore isolation device 200 may exhibit a large flow area or flow capacity through and/or around the wellbore isolation device 200 so that it does not unreasonably impede, obstruct, or inhibit production operations while the wellbore isolation device 200 degrades. As a result, production operations may be undertaken while the wellbore isolation device 200 proceeds to dissolve and/or degrade, and without creating a significant pressure restriction within the wellbore 106.

The wellbore isolation device 200 may provide a minimum production flow area across the wellbore isolation device 200. As used herein "production flow area across" the wellbore isolation device 200 refers to any fluid flow through and/or around the wellbore isolation device 200. In some embodiments, the minimum production flow area across the wellbore isolation device 200 may be a desired fraction of the total flow area of the wellbore 106 (i.e., the casing 114) at the location of the wellbore isolation device 200. More particularly, in at least one embodiment, the wellbore isolation device 200 may exhibit a production flow area across the wellbore isolation device 200 that is at least $\frac{1}{16}$ the total flow area of the wellbore 106 (i.e., the casing 114) at the location of the wellbore isolation device 200. The production flow area across the wellbore isolation device 200 may include any fluid flow through the central flow passage 210 and any other flow paths through or around the wellbore isolation device 200 that are not necessarily through the central flow passage 210. In some embodiments, for instance, the wellbore isolation device 200 may further include one or more conduits or flow channels 236 defined longitudinally through the mandrel 206 or other structural portions of the wellbore isolation device 200 through which fluids may flow during production operations.

In other embodiments, the minimum production flow area of the wellbore isolation device 200 may correspond to a desired ratio between the inner and outer diameters of the wellbore isolation device 200. The term "diameter" may refer to the diameter of the cross-sectional area of the wellbore isolation device 200 or it may be the hydraulic diameter of a flow path (or a combined flow area) through the wellbore isolation device 200. The hydraulic diameter is defined as four times the cross-sectional area divided by the wetted perimeter of the cross section. As illustrated, the wellbore isolation device 200 may exhibit an inner diameter 232 and an outer diameter 234. The inner diameter 232 may generally comprise the diameter of the central flow passage 210, and the outer diameter 234 may comprise the diameter of the wellbore isolation device 200 in the run-in or unexpanded configuration. In at least one embodiment, the inner diameter 232 of the wellbore isolation device 200 may be at least 25% (i.e., ¼) of the outer diameter 234 of the wellbore isolation device 200. The minimum 25% threshold may be calculated from the pressure drop across the wellbore isolation device 200 as a function of the flow rate through the central flow passage 210 in applications having multiple wellbore isolation devices positioned within the wellbore 106. Having the inner diameter 232 greater than 25% of the outer diameter 234 may increase the production flow area through the central flow passage 210 and thereby provide a lower pressure drop across the wellbore isolation device 200. The upper limit of the inner diameter 232 may be dependent on the structural limitations of the wellbore isolation device 200 and, more particularly, the structural limitations of the mandrel 206. For instance, the inner diameter 232 may be any diameter as long as the mandrel 206 remains able to adequately hold or maintain pressure loads that may be assumed during downhole operation.

In yet other embodiments, the minimum production flow area of the wellbore isolation device 200 may need to be larger than the aforementioned two options. With a larger number of wellbore isolation devices, with higher production flow rates, or with lower acceptable pressure drop, the minimum production flow area should be larger to achieve a lower pressure drop of the fluid across the wellbore isolation device 200. In these cases, the fraction of the total flow area should be larger, or the inner diameter 232 of the wellbore isolation device 200 should be a higher fraction of the outer diameter 234. For example, in at least one embodiment, a large number of wellbore isolation devices (e.g., greater than twenty-nine) may be required. In such embodiments, the minimum production flow area of the wellbore isolation device 200 may be achieved by having a production flow area through and/or around the wellbore isolation device 200 that is at least ⅑ of the total flow area of the wellbore 106 (i.e., the casing 114) at the location of the wellbore isolation device 200, or where the inner diameter 232 of the wellbore isolation device 200 is at least 33% (i.e., ⅓) of the outer diameter 234. In another embodiment, an even larger number of wellbore isolation devices (e.g., greater than forty-nine) may be required for a specific application. In such embodiments, the minimum production flow area of the wellbore isolation device 200 may be achieved by having a production flow area through and/or around the wellbore isolation device 200 that is at least ⅙ of the total flow area of the wellbore 106 at the location of the wellbore isolation device 200, or where the inner diameter 232 of the wellbore isolation device 200 is at least 41% of the outer diameter 234.

According to the present disclosure, at least the mandrel 206 of the wellbore isolation device 200 may be made of or otherwise comprise a degradable material configured to slowly degrade or dissolve within a wellbore environment. In other embodiments, other components of the wellbore isolation device 200 may also be made of or otherwise comprise a slowly degradable material including, but not limited to, the frac ball 208, the upper and lower slips 216a,b, the upper and lower slip wedges 218a,b, the packer elements 220, and the mule shoe 222. In addition to the foregoing, other components of the wellbore isolation device 200 that may be made of or otherwise comprise a slowly degradable material include extrusion limiters and shear pins associated with the wellbore isolation device 200. The foregoing structural elements or components of the wellbore isolation device 200 are collectively referred to herein as "the components" in the following discussion.

The rate of degradation of the slowly degradable material may depend on a number of factors including, but not limited to, the type of degradable material selected and the conditions of the wellbore environment. As used herein, a "slowly degradable material" may refer to the rate of dissolution of the degradable material, and the rate of dissolution may correspond to a rate of material loss at a predetermined temperature and within predetermined wellbore conditions. For instance, in at least one embodiment, a slowly degradable material may comprise a material that exhibits a dissolution rate between 0.01 mg/cm$^2$ per hour and 10 mg/cm$^2$ per hour at a temperature of 200° F. while exposed to a 15% potassium chloride (KCl) solution. In other embodiments, the rate of dissolution of the degradable material may correspond to how quickly the degradable material dissolves at the predetermined temperature and within the predetermined wellbore conditions. For example, in at least one embodiment, a slowly degradable material may comprise a material that loses between 0.1% and 10% of its total mass per day at 200° F. in 3% KCl solution.

The degradation of the slowly degradable material may be in the range of from a lower limit of about 5 days, 10 days, 15 days, 20 days, and 25 days to an upper limit of about 40 days, 35 days, and 30 days, encompassing any value or subset therebetween.

Suitable slowly degradable materials that may be used in accordance with the embodiments of the present disclosure include galvanically-corrodible or dissolvable metals and metal alloys. Galvanically-corrodible metals and metal alloys may be configured to degrade via an electrochemical process in which the galvanically-corrodible metal corrodes in the presence of an electrolyte (e.g., brine or other salt-containing fluids present within the wellbore 106). As used herein, an "electrolyte" is any substance containing free ions (i.e., a positively or negatively charged atom or group of atoms) that make the substance electrically conductive. The electrolyte can be selected from the group consisting of, solutions of an acid, a base, a salt, and combinations thereof. A salt can be dissolved in water, for example, to create a salt solution. Common free ions in an electrolyte include sodium (Na$^+$), potassium (K$^+$), calcium (Ca$^{2+}$), magnesium (Mg$^{2+}$), chloride (Cl$^-$), bromide (B$^-$) hydrogen phosphate (HPO$_4^{2-}$), and hydrogen carbonate (HCO$_3^-$). Preferably, the electrolyte contains chloride ions. The electrolyte can be a fluid that is introduced into the wellbore 106 or a fluid emanating from the wellbore 106, such as from a surrounding subterranean formation (e.g., the formation 108 of FIG. 1).

Suitable galvanically-corrodible metals and metal alloys include, but are not limited to, gold, gold-platinum alloys, silver, nickel, nickel-copper alloys, nickel-chromium alloys, copper, copper alloys (e.g., brass, bronze, etc.), chromium, tin, aluminum, iron, zinc, magnesium, magnesium alloys, beryllium, and any alloy of the aforementioned materials.

Suitable magnesium alloys include alloys having magnesium at a concentration in the range of about 70% to about 98%, and preferably about 80% to about 95%, by volume of the metal alloy. Magnesium alloys comprise at least one other ingredient besides the magnesium. The other ingredients can be selected from one or more metals, one or more non-metals, or a combination thereof. Suitable metals that may be alloyed with magnesium include, but are not limited to, lithium, sodium, potassium, rubidium, cesium, beryllium, calcium, strontium, barium, aluminum, gallium, indium, tin, thallium, lead, bismuth, scandium, titanium, vanadium, chromium, manganese, iron, cobalt, nickel, copper, zinc, yttrium, zirconium, niobium, molybdenum, ruthenium, rhodium, palladium, praseodymium, silver, lanthanum, hafnium, tantalum, tungsten, terbium, rhenium, osmium, iridium, platinum, gold, neodymium, gadolinium, erbium, oxides of any of the foregoing, and any combinations thereof.

Suitable non-metals that may be alloyed with magnesium include, but are not limited to, graphite, carbon, silicon, boron nitride, and combinations thereof. The carbon can be in the form of carbon particles, fibers, nanotubes, or fullerenes. The graphite can be in the form of particles, fibers, or graphene. The magnesium and its alloyed ingredient(s) may be in a solid solution and not in a partial solution or a compound where inter-granular inclusions may be present. In some embodiments, the magnesium and its alloyed ingredient(s) may be uniformly distributed throughout the magnesium alloy but, as will be appreciated, some minor variations in the distribution of particles of the magnesium and its alloyed ingredient(s) can occur.

Suitable galvanically-corrodible metals and metal alloys also include micro-galvanic metals or materials, such as solution-structured galvanic materials. An example of a solution-structured galvanic material is a magnesium alloy containing zirconium (Zr), where different domains within the alloy contain different percentages of Zr. This leads to a galvanic coupling between these different domains, which causes micro-galvanic corrosion and degradation. Micro-galvanically corrodible magnesium alloys could also be solution structured with other elements such as zinc, aluminum, manganese, nickel, cobalt, calcium, iron, carbon, tin, silver, copper, titanium, rare earth elements, etc. Examples of solution-structured micro-galvanically-corrodible magnesium alloys include ZK60, which includes 4.8% to 6.2% zinc, minimum 0.45% zirconium, 0% to 0.3% other, and balance magnesium; AZ80, which includes 7.8% to 9.2% aluminum, 0.2% to 0.8% zinc, 0.12% manganese, 0.015% other, and balance magnesium; and AZ31, which includes 2.5% to 3.5% aluminum, 0.7% to 1.3% zinc, 0.2% manganese, 0.15% other, and the balance magnesium.

In some embodiments, the slowly degradable material may comprise dissimilar metals that generate a galvanic coupling that either accelerates or decelerates the degradation rate of the component, such as the mandrel 206. As will be appreciated, such embodiments may depend on where the dissimilar metals lie on the galvanic series. In at least one embodiment, a galvanic coupling may be generated by embedding or attaching a cathodic substance or piece of material into an anodic component. For instance, the galvanic coupling may be generated by dissolving aluminum in gallium. A galvanic coupling may also be generated by using a sacrificial anode coupled to the degradable material. In such embodiments, the degradation rate of the degradable material may be decelerated until the sacrificial anode is dissolved or otherwise corroded away. As an example, the mandrel 206 may be a more electronegative material than the slip wedges 218a,b or the slips 216a,b. In such an embodiment, the galvanic coupling between the mandrel 206 and the slip wedges 218a,b and/or the slips 216a,b may cause the mandrel 206 to act as an anode and degrade before the slip wedges 218a,b and/or the slips 216a,b. Once the mandrel 206 has degraded, the slip wedges 218a,b and/or the slips 216a,b would dissolve or degrade independently.

In some embodiments, the wellbore isolation device 200 may exhibit a density that is relatively low. As will be appreciated, a low-density wellbore isolation device 200 may prove advantageous in ensuring that the wellbore isolation device 200 can be placed in extended-reach lateral wellbores. In embodiments where the slowly degradable material is a magnesium alloy, the density of the wellbore isolation device 200 may be less than 2 g/cm$^3$. In embodiments where the slowly degradable material is magnesium or an aluminum alloy, the density of the wellbore isolation device 200 may be less than 3 g/cm$^3$. In embodiments where the slowly degradable material is a material that is lighter than steel, the density of the wellbore isolation device 200 may be less than 5 g/cm$^3$. By way of example, the inclusion of lithium in a magnesium alloy can reduce the density of the alloy.

According to an embodiment, the slowly degradable material may include one or more tracers present therein. The tracer(s) can be, without limitation, radioactive, chemical, electronic, or acoustic. A tracer can be useful in determining real-time information on the rate of dissolution of the slowly degradable material. By being able to monitor the presence of the tracer, workers at the surface can make on-the-fly decisions that can affect the rate of dissolution of the remaining portions of the wellbore isolation device 200.

In some embodiments, the slowly degradable material may be at least partially encapsulated in a second material or "sheath" disposed on all or a portion of a given component of the wellbore isolation device 200. The sheath may be configured to help prolong degradation of the given component of the wellbore isolation device 200. The sheath may also serve to protect the component from abrasion within the wellbore 106. The sheath may be permeable, frangible, or comprise a material that is at least partially removable at a desired rate within the wellbore environment. In either scenario, the sheath may be designed such that it does not interfere with the ability of the wellbore isolation device 200 to form a fluid seal in the wellbore 106.

The sheath may comprise any material capable of use in a downhole environment and, depending on the component that the sheath encapsulates, the sheath may or may not be elastic such that it is able to expand with corresponding expansion of the component. For instance, a frangible sheath may break as the packer elements 220 expand to form a fluid seal, whereas a permeable sheath may remain in place on the packer elements 220 as they form the fluid seal. As used herein, the term "permeable" refers to a structure that permits fluids (including liquids and gases) therethrough and is not limited to any particular configuration.

The sheath may comprise any of the afore-mentioned degradable materials. In some embodiments, the sheath may be made of a degradable material that degrades at a rate that is faster than that of the underlying degradable material that forms the component. Other suitable materials for the sheath include, but are not limited to, a TEFLON® coating, a wax, a drying oil, a polyurethane, an epoxy, a cross-linked partially hydrolyzed polyacrylic, a silicate material, a glass, an inorganic durable material, a polymer, polylactic acid, polyvinyl alcohol, polyvinylidene chloride, a hydrophobic coating, paint, and any combination thereof.

In some embodiments, all or a portion of the outer surface of a given component of the wellbore isolation device 200 may be treated to impede degradation. For example, the outer surface of a given component may undergo a treatment that aids in preventing the degradable material (e.g., a galvanically-corrodible metal) from galvanically-corroding. Suitable treatments include, but are not limited to, an anodizing treatment, an oxidation treatment, a chromate conversion treatment, a dichromate treatment, a fluoride anodizing treatment, a hard anodizing treatment, and any combination thereof. Some anodizing treatments may result in an anodized layer of material being deposited on the outer surface of a given component. The anodized layer may comprise materials such as, but not limited to, ceramics, metals, polymers, epoxies, elastomers, or any combination thereof and may be applied using any suitable processes known to those of skill in the art. Examples of suitable processes that result in an anodized layer include, but are not limited to, soft anodized coating, anodized coating, electroless nickel plating, hard anodized coating, ceramic coatings, carbide beads coating, plastic coating, thermal spray coating, high velocity oxygen fuel (HVOF) coating, a nano HVOF coating, a metallic coating.

In some embodiments, all or a portion of the outer surface of a given component of the wellbore isolation device 200 may be treated or coated with a substance configured to enhance degradation of the degradable material. For example, such a treatment or coating may be configured to remove a protective coating or treatment or otherwise accelerate the degradation of the degradable material of the given component. An example is a galvanically-corroding metal coated with a layer of polyglycolic acid (PGA). In this example, the PGA would undergo hydrolysis and cause the surrounding fluid to become more acidic, which would accelerate the degradation of the underlying metal.

While the foregoing description and embodiments are directed primarily to a degradable or disappearing frac plug, those skilled in the art will readily recognize that the principles of the present disclosure could equally be applied to any traditional wellbore isolation device including, but not limited to, a bridge plug, a wellbore packer, a wiper plug, a cement plug, or any combination thereof. Moreover, while the foregoing description and embodiments are directed primarily to setting wellbore isolation devices within a casing 114 (FIGS. 1 and 2), the principles of the present disclosure are equally applicable to open hole applications.

Embodiments disclosed herein include:

A. A downhole tool for use in a wellbore lined with casing that includes a wellbore isolation device that provides a plurality of components including a mandrel that defines a central flow passage that allows fluid flow in at least one direction through the wellbore isolation device, the wellbore isolation device providing an inner diameter and an outer diameter, wherein a minimum production flow area is provided across the wellbore isolation device and is determined by at least one of a flow area across the wellbore isolation device that is at least 1/16 a total flow area of the casing at a location of the wellbore isolation device within the wellbore, and a flow area resulting from the inner diameter being at least 25% of the outer diameter, and wherein at least the mandrel is made of a slowly degradable material that degrades when exposed to a wellbore environment.

B. A method that includes introducing a wellbore isolation device into a wellbore lined at least partially with casing, the wellbore isolation device providing a plurality of components including a mandrel that defines a central flow passage that allows fluid flow in at least one direction through the wellbore isolation device, wherein at least the mandrel is made of a slowly degradable material, anchoring the wellbore isolation device within the casing at a target location, the wellbore isolation device providing an inner diameter and an outer diameter, performing at least one downhole operation, degrading at least the mandrel upon exposing the wellbore isolation device to a wellbore environment, and commencing production operations within the wellbore, wherein a minimum production flow area is provided across the wellbore isolation device and is determined by at least one of a flow area across the wellbore isolation device that is at least 1/16 a total flow area of the casing at a location of the wellbore isolation device within the wellbore, and a flow area resulting from the inner diameter being at least 25% of the outer diameter.

C. A hydraulic frac plug that includes a mandrel having a central flow passage defined therethrough and providing an inner diameter and an outer diameter, one or more packer elements disposed about the mandrel and expandable to seal against casing secured within a wellbore, an upper slip wedge and a lower slip wedge each disposed about the mandrel on opposing sides of the one or more packer elements, and an upper slip and a lower slip each disposed about the mandrel on opposing sides of the one or more packer elements and actuatable to anchor the hydraulic frac plug within the casing, wherein at least the mandrel is made of a slowly degradable material that degrades when exposed to a wellbore environment, wherein a minimum production flow area is provided across the hydraulic frac plug and is determined by at least one of a flow area across the hydraulic frac plug that is at least 1/16 a total flow area of the casing at a location of the hydraulic frac plug within the wellbore, and a flow area resulting from the inner diameter being at least 25% of the outer diameter.

Each of embodiments A, B, and C may have one or more of the following additional elements in any combination: Element 1: wherein the wellbore isolation device is selected from the group consisting of a frac plug, a wellbore packer, a deployable baffle, or any combination thereof. Element 2: wherein the flow area across the wellbore isolation device includes any fluid flow area through the central flow passage and through any other flow paths through or around the wellbore isolation device. Element 3: wherein the other flow paths comprise at least one flow channel defined longitudinally through the mandrel through which fluids may flow. Element 4: wherein the inner diameter comprises a diameter of the central flow passage, and the outer diameter comprises a diameter of the wellbore isolation device in an unexpanded configuration. Element 5: wherein the minimum production flow area of the wellbore isolation device is determined by a combination of a flow area across the wellbore isolation device that is at least 1/8 of the total flow area of the casing at the location of the wellbore isolation device within the wellbore, and a flow area resulting from the inner diameter being at least 33% of the outer diameter. Element 6: wherein one or more of the plurality of components are made of the slowly degradable material, the plurality of components selected from the group consisting of a frac ball, a slip, a slip wedge, a packer element, a mule shoe, and any combination thereof. Element 7: wherein the slowly degradable material comprises a material that exhibits a dissolution rate between 0.01 mg/cm2 per hour and 10 mg/cm2 per hour at a temperature of 200° F. while exposed to a 15% potassium chloride (KCl) solution. Element 8: wherein the slowly degradable material comprises a material that loses between 0.1% and 10% of its total mass per day at 200° F. in 3% potassium chloride (KCl) solution. Element 9: wherein the degradable material is a galvanically-corrodible metal or metal alloy. Element 10: wherein the galvanically-corrodible metal or metal alloy is selected from the group consisting of aluminum, iron, zinc, magnesium, a magnesium alloy, beryllium, and any alloy thereof. Element 11: wherein the magnesium alloy includes magnesium at a concentration in the range of about 70% to about 98%. Element 12: wherein the magnesium alloy includes magnesium and a metal selected from the group consisting of lithium, sodium, potassium, rubidium, cesium, beryllium, calcium, strontium, barium, aluminum, gallium, indium, tin, thallium, lead, bismuth, scandium, titanium, vanadium, chromium, manganese, iron, cobalt, nickel, copper, zinc, yttrium, zirconium, niobium, molybdenum, ruthenium, rhodium, palladium, praseodymium, silver, lanthanum, hafnium, tantalum, tungsten, terbium, rhenium, osmium, iridium, platinum, gold, neodymium, gadolinium, erbium, oxides of any of the foregoing, and any combinations thereof. Element 13: wherein the magnesium alloy includes magnesium and a non-metal selected from the group consisting of graphite, carbon, silicon, boron nitride, and any combinations thereof. Element 14: wherein the magnesium alloy is selected from the group consisting of: 4.8% to 6.2% zinc, a minimum 0.45% zirconium, up to 0.3% impurities, and balance magnesium; 7.8% to 9.2% aluminum, 0.2% to 0.8% zinc, 0.12% manganese, up to 0.015% impurities, and balance magnesium; 2.5% to 3.5% aluminum, 0.7% to 1.3% zinc, 0.2% manganese, up to 0.15% impurities, and balance magnesium; and any combinations thereof. Element 15: wherein the wellbore isolation device exhibits a density selected from the group consisting of: a density that is less than 2 g/cm3 when the slowly degradable material is a magnesium alloy, a density that is less than 3 g/cm3 when the slowly degradable material is magnesium or an aluminum alloy, a density that is less than 5 g/cm3 when the slowly degradable material is a material that is lighter than steel, and any combinations thereof. Element 16: further comprising a sheath disposed on all or a portion of at least one of the plurality of components, the sheath comprising a material selected from the group consisting of a TEFLON® coating, a wax, a drying oil, a polyurethane, an epoxy, a crosslinked partially hydrolyzed polyacrylic, a silicate material, a glass, an inorganic durable material, a polymer, polylactic acid, polyvinyl alcohol, polyvinylidene chloride, a hydrophobic coating, paint, and any combination thereof.

Element 17: wherein the wellbore isolation device is selected from the group consisting of a frac plug, a wellbore packer, a deployable baffle, or any combination thereof. Element 18: wherein the minimum production flow area of the wellbore isolation device is determined by a combination of a flow area across the wellbore isolation device that is at least ⅙ of the total flow area of the casing at the location of the wellbore isolation device within the wellbore, and a flow area resulting from the inner diameter being at least 33% of the outer diameter. Element 19: wherein one or more of the plurality of components are made of the slowly degradable material, the method further comprising degrading the one or more of the plurality of components upon exposing the wellbore isolation device to the wellbore environment. Element 20: wherein degrading at least the mandrel comprises degrading the mandrel at a dissolution rate between 0.01 mg/cm2 per hour and 10 mg/cm2 per hour at a temperature of 200° F. while exposed to a 15% potassium chloride (KCl) solution. Element 21: wherein degrading at least the mandrel comprises losing between 0.1% and 10% of a total mass of the mandrel per day at 200° F. in 3% potassium chloride (KCl) solution. Element 22: wherein the degradable material is a galvanically-corrodible metal or metal alloy selected from the group consisting of gold, a gold-platinum alloy, silver, nickel, a nickel-copper alloy, a nickel-chromium alloy, copper, a copper alloy, chromium, tin, aluminum, iron, zinc, magnesium, a magnesium alloy, beryllium, and any alloy thereof.

Element 23: wherein the minimum production flow area of the hydraulic frac plug is determined by a combination of a flow area across the hydraulic frac plug that is at least ⅙ of the total flow area of the casing at the location of the hydraulic frac plug within the wellbore, and a flow area resulting from the inner diameter being at least 33% of the outer diameter. Element 24: wherein the slowly degradable material comprises a material that exhibits a dissolution rate between 0.01 mg/cm2 per hour and 10 mg/cm2 per hour at a temperature of 200° F. while exposed to a 15% potassium chloride (KCl) solution. Element 25: wherein the slowly degradable material comprises a material that loses between 0.1% and 10% of its total mass per day at 200° F. in 3% potassium chloride (KCl) solution. Element 26: wherein the degradable material is a galvanically-corrodible metal or metal alloy selected from the group consisting of gold, a gold-platinum alloy, silver, nickel, a nickel-copper alloy, a nickel-chromium alloy, copper, a copper alloy, chromium, tin, aluminum, iron, zinc, magnesium, a magnesium alloy, beryllium, and any alloy thereof. Element 27: wherein the magnesium alloy includes magnesium at a concentration in the range of about 70% to about 98%. Element 28: wherein the magnesium alloy includes magnesium and a metal selected from the group consisting of lithium, sodium, potassium, rubidium, cesium, beryllium, calcium, strontium, barium, aluminum, gallium, indium, tin, thallium, lead, bismuth, scandium, titanium, vanadium, chromium, manganese, iron, cobalt, nickel, copper, zinc, yttrium, zirconium, niobium, molybdenum, ruthenium, rhodium, palladium, praseodymium, silver, lanthanum, hafnium, tantalum, tungsten, terbium, rhenium, osmium, iridium, platinum, gold, neodymium, gadolinium, erbium, oxides of any of the foregoing, and any combinations thereof. Element 29: wherein the magnesium alloy is selected from the group consisting of: 4.8% to 6.2% zinc, a minimum 0.45% zirconium, up to 0.3% impurities, and balance magnesium; 7.8% to 9.2% aluminum, 0.2% to 0.8% zinc, 0.12% manganese, up to 0.015% impurities, and balance magnesium; 2.5% to 3.5% aluminum, 0.7% to 1.3% zinc, 0.2% manganese, up to 0.15% impurities, and balance magnesium; and any combinations thereof. Element 30: wherein the hydraulic frac plug exhibits a density selected from the group consisting of: a density that is less than 2 g/cm3 when the slowly degradable material is a magnesium alloy, a density that is less than 3 g/cm3 when the slowly degradable material is magnesium or an aluminum alloy, a density that is less than 5 g/cm3 when the slowly degradable material is a material that is lighter than steel, and any combination thereof.

By way of non-limiting example, exemplary combinations applicable to A, B, C include: Element 2 with Element 3; Element 10 with Element 11; Element 11 with Element 12; Element 11 with Element 13; Element 11 with Element 14; Element 26 with Element 27; and Element 26 with Element 28.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:
1. A downhole tool for use in a wellbore lined with casing, comprising:
    a wellbore isolation device that provides a plurality of components including a mandrel that defines a central flow passage that allows fluid flow in at least one direction through the wellbore isolation device, the wellbore isolation device providing an inner diameter and an outer diameter,
wherein a minimum production flow area is provided across the wellbore isolation device and is determined by at least one of:
a flow area across the wellbore isolation device that is at least 1/16 a total flow area of the casing at a location of the wellbore isolation device within the wellbore; and
a flow area resulting from the inner diameter being at least 25% of the outer diameter,
wherein the inner diameter comprises a diameter of the central flow passage, and the outer diameter comprises a diameter of the wellbore isolation device in an unexpanded configuration, and
wherein at least the mandrel is made of a slowly degradable material that degrades when exposed to a wellbore environment.

2. The downhole tool of claim 1, wherein the wellbore isolation device is selected from the group consisting of a frac plug, a wellbore packer, a deployable baffle, or any combination thereof.

3. The downhole tool of claim 1, wherein the flow area across the wellbore isolation device includes any fluid flow area through the central flow passage and through any other flow paths through or around the wellbore isolation device.

4. The downhole tool of claim 3, wherein the other flow paths comprise at least one flow channel defined longitudinally through the mandrel through which fluids may flow.

5. The downhole tool of claim 1, wherein the minimum production flow area of the wellbore isolation device is determined by a combination of:
a flow area across the wellbore isolation device that is at least 1/9 of the total flow area of the casing at the location of the wellbore isolation device within the wellbore; and
a flow area resulting from the inner diameter being at least 33% of the outer diameter.

6. The downhole tool of claim 1, wherein one or more of the plurality of components are made of the slowly degradable material, the plurality of components selected from the group consisting of a frac ball, a slip, a slip wedge, a packer element, a mule shoe, and any combination thereof.

7. The downhole tool of claim 1, wherein the slowly degradable material comprises a material that exhibits a dissolution rate between 0.01 mg/cm2 per hour and 10 mg/cm2 per hour at a temperature of 200° F. while exposed to a 15% potassium chloride (KCl) solution.

8. The downhole tool of claim 1, wherein the slowly degradable material comprises a material that loses between 0.1% and 10% of its total mass per day at 200° F. in 3% potassium chloride (KCl) solution.

9. The downhole tool of claim 1, wherein the degradable material is a galvanically-corrodible metal or metal alloy.

10. The downhole tool of claim 9, wherein the galvanically-corrodible metal or metal alloy is selected from the group consisting of aluminum, iron, zinc, magnesium, a magnesium alloy, beryllium, and any alloy thereof.

11. The downhole tool of claim 10, wherein the magnesium alloy includes magnesium at a concentration in a range of about 70% to about 98%.

12. The downhole tool of claim 10, wherein the magnesium alloy includes magnesium and a metal selected from the group consisting of lithium, sodium, potassium, rubidium, cesium, beryllium, calcium, strontium, barium, aluminum, gallium, indium, tin, thallium, lead, bismuth, scandium, titanium, vanadium, chromium, manganese, iron, cobalt, nickel, copper, zinc, yttrium, zirconium, niobium, molybdenum, ruthenium, rhodium, palladium, praseodymium, silver, lanthanum, hafnium, tantalum, tungsten, terbium, rhenium, osmium, iridium, platinum, gold, neodymium, gadolinium, erbium, oxides of any of the foregoing, and any combinations thereof.

13. The downhole tool of claim 10, wherein the magnesium alloy includes magnesium and a non-metal selected from the group consisting of graphite, carbon, silicon, boron nitride, and any combinations thereof.

14. The downhole tool of claim 10, wherein the magnesium alloy is selected from the group consisting of:
4.8% to 6.2% zinc, a minimum 0.45% zirconium, up to 0.3% impurities, and balance magnesium;
7.8% to 9.2% aluminum, 0.2% to 0.8% zinc, 0.12% manganese, up to 0.015% impurities, and balance magnesium;
2.5% to 3.5% aluminum, 0.7% to 1.3% zinc, 0.2% manganese, up to 0.15% impurities, and balance magnesium; and
any combinations thereof.

15. The downhole tool of claim 1, wherein the wellbore isolation device exhibits a density selected from the group consisting of:
a density that is less than 2 g/cm3 when the slowly degradable material is a magnesium alloy;
a density that is less than 3 g/cm3 when the slowly degradable material is magnesium or an aluminum alloy;
a density that is less than 5 g/cm3 when the slowly degradable material is a material that is lighter than steel;
and any combinations thereof.

16. The downhole tool of claim 1, further comprising a sheath disposed on all or a portion of at least one of the plurality of components, the sheath comprising a material selected from the group consisting of a TEFLON® coating, a wax, a drying oil, a polyurethane, an epoxy, a crosslinked partially hydrolyzed polyacrylic, a silicate material, a glass, an inorganic durable material, a polymer, polylactic acid, polyvinyl alcohol, polyvinylidene chloride, a hydrophobic coating, paint, and any combination thereof.

17. A method, comprising:
introducing a wellbore isolation device into a wellbore lined at least partially with casing, the wellbore isolation device providing a plurality of components including a mandrel that defines a central flow passage that allows fluid flow in at least one direction through the wellbore isolation device, wherein at least the mandrel is made of a slowly degradable material;
anchoring the wellbore isolation device within the casing at a target location, the wellbore isolation device providing an inner diameter and an outer diameter;
performing at least one downhole operation;
degrading at least the mandrel upon exposing the wellbore isolation device to a wellbore environment; and
commencing production operations within the wellbore, wherein a minimum production flow area is provided across the wellbore isolation device and is determined by at least one of:
a flow area across the wellbore isolation device that is at least 1/16 a total flow area of the casing at a location of the wellbore isolation device within the wellbore; and
a flow area resulting from the inner diameter being at least 25% of the outer diameter.

18. The method of claim 17, wherein the wellbore isolation device is selected from the group consisting of a frac plug, a wellbore packer, a deployable baffle, or any combination thereof.

19. The method of claim 17, wherein the minimum production flow area of the wellbore isolation device is determined by a combination of:
a flow area across the wellbore isolation device that is at least 1/6 of the total flow area of the casing at the location of the wellbore isolation device within the wellbore; and
a flow area resulting from the inner diameter being at least 33% of the outer diameter.

20. The method of claim 17, wherein one or more of the plurality of components are made of the slowly degradable material, the method further comprising degrading the one or more of the plurality of components upon exposing the wellbore isolation device to the wellbore environment.

21. The method of claim 17, wherein degrading at least the mandrel comprises degrading the mandrel at a dissolution rate between 0.01 mg/cm2 per hour and 10 mg/cm2 per hour at a temperature of 200° F. while exposed to a 15% potassium chloride (KCl) solution.

22. The method of claim 17, wherein degrading at least the mandrel comprises losing between 0.1% and 10% of a total mass of the mandrel per day at 200° F. in 3% potassium chloride (KCl) solution.

23. The method of claim 17, wherein the degradable material is a galvanically-corrodible metal or metal alloy selected from the group consisting of gold, a gold-platinum alloy, silver, nickel, a nickel-copper alloy, a nickel-chromium alloy, copper, a copper alloy, chromium, tin, aluminum, iron, zinc, magnesium, a magnesium alloy, beryllium, and any alloy thereof.

24. A hydraulic frac plug, comprising:
a mandrel having a central flow passage defined therethrough and providing an inner diameter and an outer diameter;
one or more packer elements disposed about the mandrel and expandable to seal against casing secured within a wellbore;
an upper slip wedge and a lower slip wedge each disposed about the mandrel on opposing sides of the one or more packer elements; and
an upper slip and a lower slip each disposed about the mandrel on opposing sides of the one or more packer elements and actuatable to anchor the hydraulic frac plug within the casing, wherein at least the mandrel is made of a slowly degradable material that degrades when exposed to a wellbore environment,
wherein a minimum production flow area is provided across the hydraulic frac plug and is determined by at least one of:
a flow area across the hydraulic frac plug that is at least 1/16 a total flow area of the casing at a location of the hydraulic frac plug within the wellbore; and
a flow area resulting from the inner diameter being at least 25% of the outer diameter, and
wherein the inner diameter comprises a diameter of the central flow passage, and the outer diameter comprises a diameter of the hydraulic frac plug in an unexpanded configuration.

25. The hydraulic frac plug of claim 24, wherein the minimum production flow area of the hydraulic frac plug is determined by a combination of:
a flow area across the hydraulic frac plug that is at least 1/6 of the total flow area of the casing at the location of the hydraulic frac plug within the wellbore; and
a flow area resulting from the inner diameter being at least 33% of the outer diameter.

26. The hydraulic frac plug of claim 24, wherein the slowly degradable material comprises a material that exhibits a dissolution rate between 0.01 mg/cm2 per hour and 10 mg/cm2 per hour at a temperature of 200° F. while exposed to a 15% potassium chloride (KCl) solution.

27. The hydraulic frac plug of claim 24, wherein the slowly degradable material comprises a material that loses between 0.1% and 10% of its total mass per day at 200° F. in 3% potassium chloride (KCl) solution.

28. The hydraulic frac plug of claim 24, wherein the degradable material is a galvanically-corrodible metal or metal alloy selected from the group consisting of gold, a gold-platinum alloy, silver, nickel, a nickel-copper alloy, a nickel-chromium alloy, copper, a copper alloy, chromium, tin, aluminum, iron, zinc, magnesium, a magnesium alloy, beryllium, and any alloy thereof.

29. The hydraulic frac plug of claim 28, wherein the magnesium alloy includes magnesium at a concentration in a range of about 70% to about 98%.

30. The hydraulic frac plug of claim 28, wherein the magnesium alloy includes magnesium and a metal selected from the group consisting of lithium, sodium, potassium, rubidium, cesium, beryllium, calcium, strontium, barium, aluminum, gallium, indium, tin, thallium, lead, bismuth, scandium, titanium, vanadium, chromium, manganese, iron, cobalt, nickel, copper, zinc, yttrium, zirconium, niobium, molybdenum, ruthenium, rhodium, palladium, praseodymium, silver, lanthanum, hafnium, tantalum, tungsten, terbium, rhenium, osmium, iridium, platinum, gold, neodymium, gadolinium, erbium, oxides of any of the foregoing, and any combinations thereof.

31. The hydraulic frac plug of claim 24, wherein the magnesium alloy is selected from the group consisting of:
4.8% to 6.2% zinc, a minimum 0.45% zirconium, up to 0.3% impurities, and balance magnesium;
7.8% to 9.2% aluminum, 0.2% to 0.8% zinc, 0.12% manganese, up to 0.015% impurities, and balance magnesium;
2.5% to 3.5% aluminum, 0.7% to 1.3% zinc, 0.2% manganese, up to 0.15% impurities, and balance magnesium; and
any combinations thereof.

32. The hydraulic frac plug of claim 24, wherein the hydraulic frac plug exhibits a density selected from the group consisting of:
a density that is less than 2 g/cm3 when the slowly degradable material is a magnesium alloy;
a density that is less than 3 g/cm3 when the slowly degradable material is magnesium or an aluminum alloy;
a density that is less than 5 g/cm3 when the slowly degradable material is a material that is lighter than steel; and
any combinations thereof.

* * * * *